May 1, 1951  M. W. ELLEFSON  2,551,427
BALE LOADER
Filed Feb. 24, 1947  3 Sheets-Sheet 1
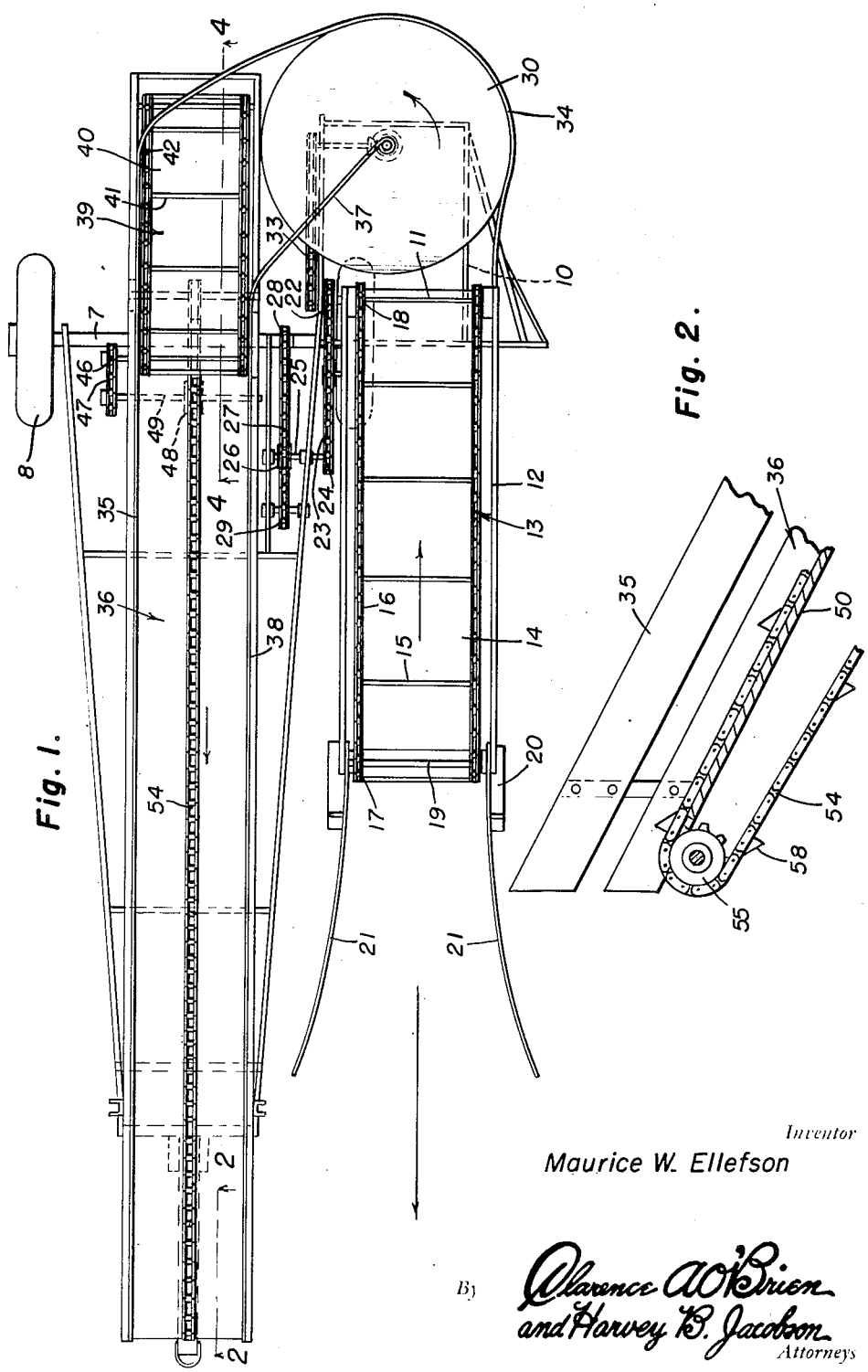
Inventor
Maurice W. Ellefson

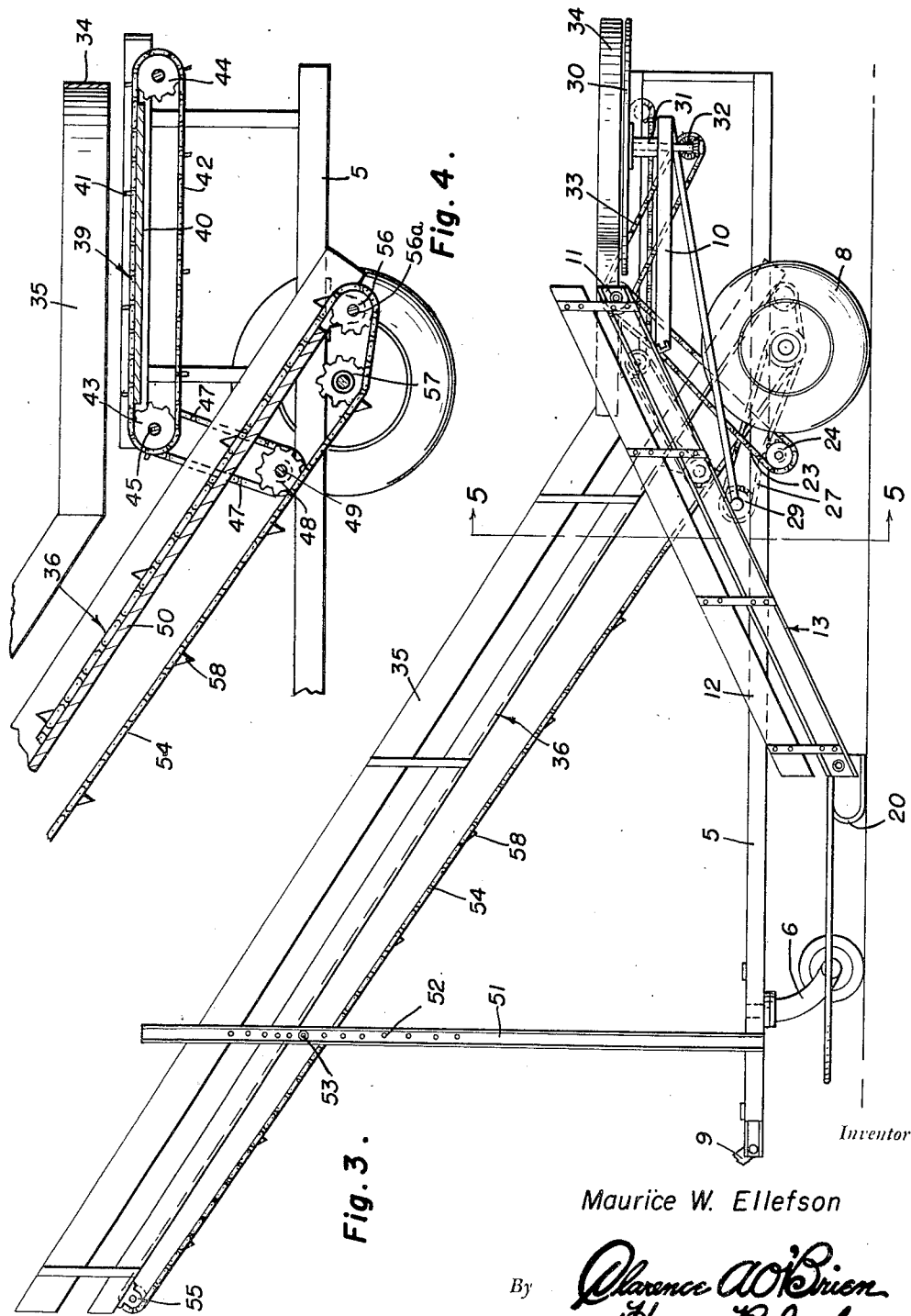

May 1, 1951 M. W. ELLEFSON 2,551,427
BALE LOADER
Filed Feb. 24, 1947 3 Sheets-Sheet 3

Inventor
Maurice W. Ellefson

By Clarence A. O'Brien
and Harvey B. Jacobson
Attorneys

Patented May 1, 1951

2,551,427

UNITED STATES PATENT OFFICE 2,551,427

BALE LOADER

Maurice W. Ellefson, Alden, Iowa

Application February 24, 1947, Serial No. 730,400

1 Claim. (Cl. 198—7)

The present invention relates to new and useful improvements in loading machines for bales of hay, straw and other baled material and has for its primary object to provide means for picking up the bales lying on the ground and loading the same onto a vehicle traveling adjacent the loader.

An important object of the present invention is to provide a rearwardly traveling pickup elevator for picking up the bales from the ground and delivering the same onto a turntable for transferring the bales onto a forwardly traveling elevator or delivering the bales to a towing vehicle.

A further object of the invention is to provide a loader of this character in which the bales are at all times arranged to travel lengthwise for loading in a lengthwise position onto a vehicle towing the loader.

A still further object of the invention is to provide a pickup elevator pivotally carried by the machine and supported at its lower end on skids arranged at all times to travel on the surface of the ground.

A still further object of the invention is to provide an apparatus of this character of simple and practical construction, which is efficient and reliable in operation, strong and durable and which otherwise is well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view.

Figure 2 is an enlarged fragmentary sectional view taken on the line 2—2 of Figure 1.

Figure 3 is a side elevational view.

Figure 4 is a fragmentary longitudinal sectional view taken on a line 4—4 of Figure 1.

Figure 5:
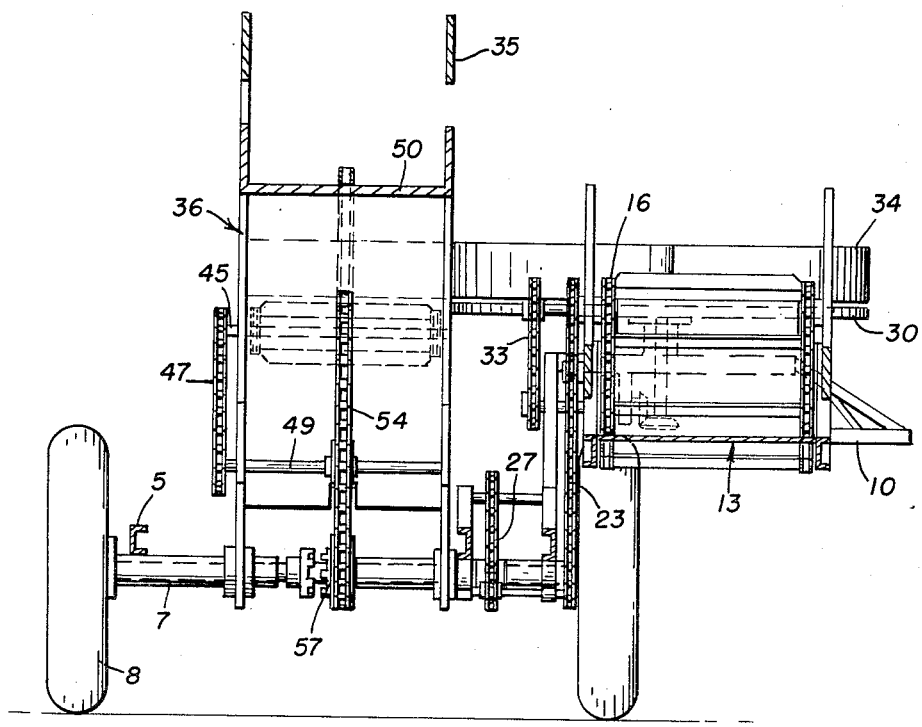
Figure 5 is a transverse sectional view taken on a line 5—5 of Figure 3.
Figure 6:
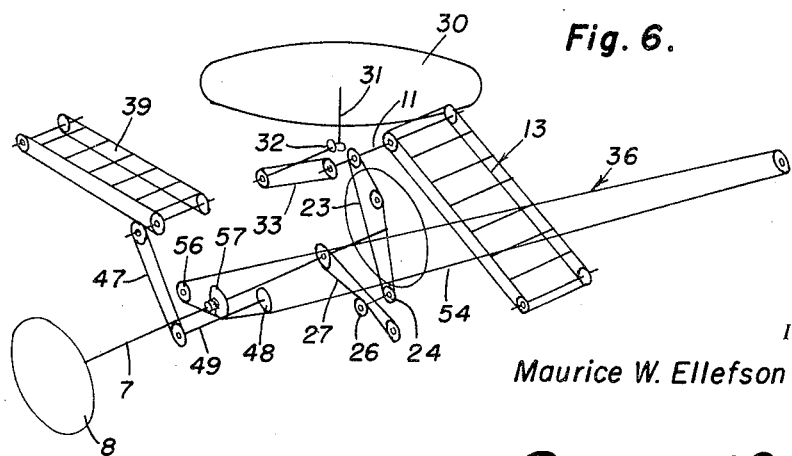
Figure 6 is a diagram showing the drive means for the several elevators and turntable.

Referring now to the drawings in detail wherein for the purpose of illustration we have disclosed a preferred embodiment of the invention the numeral 5 designates a frame supported at its front end on a swively mounted wheel 6 and supported at its rear end on a rear axle 7 having wheels 8 suitably secured to the ends of the axle for rotating the axle upon a movement of the device over the ground. A tongue 9 is connected to the front end of the frame 5 by means of which the machine may be pulled over the ground by a towing vehicle, such as a truck, wagon or the like.

A lateral frame 10 is suitably supported at the rear end of the frame 5 and at one side thereof and on which is journaled a transverse shaft 11 which pivotally supports the rear ends of side guards 12 of a forwardly extending endless pickup conveyor conveyor designated generally at 13.

The conveyor 13 includes a platform 14 supported between the guards 12 and over which transverse slats or cleats are adapted to travel, the ends of the slats being connected to chains 16 traveling over front and rear sprockets 17 and 18. The front sprockets 17 are journaled on a transverse shaft 19 supported at the front end of the guards 12 and the rear sprockets 18 are keyed or otherwise suitably secured to the shaft 11.

The front end of the conveyor 13 is supported on skids 20 and from which guide arms 21 project horizontally forwardly in outwardly diverging relation with respect to each other.

The shaft 11 is driven by a sprocket 22 and chain 23, the chain being driven by a sprocket 24 secured at one end of a shaft 25 journaled to a part of the frame 5. A second sprocket 26 is also secured to the shaft 25 which is driven by a chain 27 from a sprocket 28 secured to the axle 7, the axle being rotated by a forward movement of the machine over the ground.

The sprocket 26 is engaged by the chain 27 under the lower flight thereof as shown in Figure 3 of the drawings whereby to reverse the travel of the chain 23 and chains 16 of the conveyor 13 whereby the upper flight of the conveyor will travel in a rearward direction as shown by the arrow in Figure 1 of the drawings. The front end of the chain 27 is trained over an idler sprocket 29.

A turntable 30 is rotatably secured on the lateral frame 10 by means of a vertical shaft 31 supporting the underside of the turntable, the shaft 31 being driven by gears 32 and a chain and sprocket drive 33 from the shaft 11 to rotate the turntable in a counter-clockwise direction as shown by the arrow in Figure 2.

A guard 34 extends around the rear and outer side edges of the turntable 30 and merges with the rear end of a longitudinally extending guard 35 at the outer side edge of an elevator designated generally at 36. A second guard 37 extends from the center of the turntable 30 in a forward direction and merges with the longitudinal guard 38 at the other side of the elevator 36.

At the rear end of the elevator 36 is an endless conveyor designated generally at 39 and which includes a stationary platform 40 over which transversely extending slats or cleats 41 are adapted to travel, the ends of the slats being connected to chains 42 traveling over front and rear sprockets 43 and 44. The front sprockets 43 are secured to a transverse shaft 45 which is driven by a sprocket 46 and chain 47 from a sprocket 48 secured at one end of a transverse shaft 49 journaled at the rear end of the elevator 36. The front end of the conveyor 39 overlies the rear end of the elevator 36 as shown more clearly in Figure 4 of the drawings.

The elevator 36 also includes a stationary platform 50 secured between the guards 35 and 38 and supported in an upwardly and forwardly inclined position by means of a pair of standards 51 secured at their lower ends to the front end of the frame 5, the standards being formed with vertically spaced openings 52 selectively receiving a bar 53 extending transversely under the platform 50 to support the front end of the elevator 36 in vertically adjusted position.

An endless chain 54 has its upper and lower flights traveling above and below the platform 50, the front end of the chain traveling over a sprocket 55 mounted at the front end of the platform 50 and the rear end of the chain traveled over a sprocket 56 mounted on a shaft 56a journaled to the frame 5 to pivotally support the rear end of the elevator. The lower flight of the chain engages the lower portion of a sprocket 57 which is secured to the axle 7 whereby to drive the chain in a direction as shown by the arrows in Figure 4 and so that the upper flight of the chain will travel forwardly on the upper surface of the platform 50. The chain 54 is provided with cleats 58 to properly grip the bales for moving the latter upwardly and forwardly along the elevator 36.

The lower flight of the chain 54 also serves to drive the sprocket 48 for the conveyor 39.

In the operation of the device the tongue 9 is connected to a towing vehicle, such as a truck, wagon or the like and its skids 20 at the front end of the conveyor 13 slide along the ground as the machine is pulled by the vehicle. The arms 21 guide bales of hay, straw or the like onto the front end of the pickup conveyor 13 and are discharged onto the turntable 30 which rotates in the direction as shown by the arrow in Figure 1 and delivers the bales onto the conveyor 39 at the rear end of the elevator 36. The bales are moved forwardly on the conveyor 39 onto the rear end of the elevator 36 where the bales are then moved forwardly and upwardly by the elevator and discharged at the front end thereof onto the towing vehicle.

The guards 12 at the sides of the conveyor 13 and the guards 34, 35, 37 and 38 keep the bales traveling lengthwise on the several conveyors and elevators so that the bales are delivered in an endwise position onto the towing vehicle.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

I claim:

A bale loader comprising a trailer, a pickup conveyor, means pivotally supporting the delivery end of said conveyor on the trailer, the receiving end of the conveyor extending forwardly at one side of the trailer, skids supporting the receiving end of the conveyor on the ground, an elevator pivoted at its receiving end on the trailer and extending forwardly and upwardly therefrom, a vertically adjustable support for the delivery end of the elevator, a horizontal conveyor arranged with its delivery end overlying the receiving end of the elevator, a turntable arranged to receive bales from the delivery end of the pickup conveyor and transfer the same onto said horizontal conveyor, and means operated by the trailer for driving said conveyors, elevator and turntable.

MAURICE W. ELLEFSON.

REFERENCES CITED

The following references are of record in the file of this patent:

UNITED STATES PATENTS

| Number | Name | Date |
| --- | --- | --- |
| 961,193 | Wood | June 14, 1910 |
| 1,057,579 | Rasmussen | Apr. 1, 1913 |
| 1,284,667 | Harris | Nov. 12, 1918 |
| 1,788,995 | Fuerstenau | Jan. 13, 1931 |